US007149966B2

(12) United States Patent
Jones et al.

(10) Patent No.: US 7,149,966 B2
(45) Date of Patent: Dec. 12, 2006

(54) WORD PROCESSOR FOR FREESTYLE EDITING OF WELL-FORMED XML DOCUMENTS

(75) Inventors: Brian M. Jones, Redmond, WA (US); Marcin Sawicki, Kirkland, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 10/179,529

(22) Filed: Jun. 24, 2002

(65) Prior Publication Data

US 2003/0237048 A1 Dec. 25, 2003

(51) Int. Cl.
*G06F 17/00* (2006.01)
*G06F 9/44* (2006.01)

(52) U.S. Cl. ............... 715/513; 715/530; 717/110; 717/111; 717/112

(58) Field of Classification Search ........... 715/513, 715/530; 717/110, 111, 112
See application file for complete search history.

(56) References Cited

U.S. PATENT DOCUMENTS

| 6,558,431 | B1* | 5/2003 | Lynch et al. ............... 715/513 |
| 6,604,100 | B1* | 8/2003 | Fernandez et al. ........... 707/3 |
| 6,687,873 | B1* | 2/2004 | Ballantyne et al. .......... 715/500 |
| 6,711,740 | B1* | 3/2004 | Moon et al. ............... 719/328 |
| 6,895,551 | B1* | 5/2005 | Huang et al. .............. 715/513 |
| 6,934,712 | B1* | 8/2005 | Kiernan et al. ............. 707/102 |
| 6,996,770 | B1* | 2/2006 | Deen et al. ................ 715/513 |
| 2001/0044811 | A1* | 11/2001 | Ballantyne et al. ......... 707/513 |
| 2002/0120647 | A1* | 8/2002 | Amano ................... 707/501.1 |
| 2002/0169593 | A1* | 11/2002 | Lemon .......................... 704/4 |
| 2003/0088543 | A1* | 5/2003 | Skeen et al. ................. 707/1 |
| 2003/0172193 | A1* | 9/2003 | Olsen ........................ 709/315 |
| 2003/0237046 | A1* | 12/2003 | Parker et al. ............... 715/513 |
| 2004/0015832 | A1* | 1/2004 | Stapp et al. ................ 717/106 |
| 2004/0153967 | A1* | 8/2004 | Bender et al. .............. 715/513 |
| 2004/0205550 | A1* | 10/2004 | Gerken ..................... 715/513 |
| 2004/0205562 | A1* | 10/2004 | Rozek et al. ............... 715/513 |
| 2004/0205565 | A1* | 10/2004 | Gupta ...................... 715/513 |

OTHER PUBLICATIONS

Ouahid et al. (Ouahid), Converting Web pages into Well-formed XML Documents, 1999, IEEE Database, pp. 676-680.*
*Making XML Content Creation Easy*—www3.corel.com; 2002 Corel Corporation.
SoftQuad Software Inc. Announces XMetaL. Latest XML/SGML Content Authoring Tool; No Author; 98-1117 Document Type-Business Wire Source of Article(s)—Newswire; Toronto, Canada (Business Wire) Nov. 17, 1998.

* cited by examiner

*Primary Examiner*—William Bashore
*Assistant Examiner*—Chau Nguyen
(74) *Attorney, Agent, or Firm*—Merchant & Gould P.C.; Ryan T. Grace

(57) ABSTRACT

A word-processor that provides a freestyle-editing environment for editing an XML document while monitoring the XML document for well-formedness. The word processor monitors the XML document to determine if the XML document is well-formed and to automatically correct the XML document to maintain well-formedness.

11 Claims, 4 Drawing Sheets

WORD PROCESSOR FOR FREESTYLE EDITING OF WELL-FORMED XML DOCUMENTS

BACKGROUND OF THE INVENTION

In the past, a user had two options for creating documents. One option was to use a word processor with rich text formatting capabilities, which allowed the user to shape the appearance of the documents to fit her needs. However, this type of word processor was not designed to associate semantics with content, such as using markups in the documents. The other option was to use a plain text editor, which required the user to manually create the markups along with the content. The disadvantage of using a text editor was that the user could not control the presentation and layout of the documents. Also, markup creation was typically done manually with very little automated assistance from the text editor to make the editing of markup documents easier to perform. One type of such popular markup documents are Extensible Markup Language (XML) documents.

XML is a universal language that provides a way to identify, exchange, and process various kinds of data. In order to provide greater transportability, the syntax of XML documents, which is defined by an XML standard, is extremely regular and predictable. An XML document that conforms to the XML standard is considered "well-formed." XML documents are comprised of XML elements. An XML element typically takes the form of "<element>content</element>", where the portions within brackets (<>), also known as "tags", define the beginning and end of an element, and the portion between the brackets is the content of the element.

Even though practically every XML tag takes this same form, traditional text editors and word processors require the user to manually enter every character, opening the door to much human error. In addition, because neither traditional word processors nor text editors includes automatic XML validation mechanisms, any structural error in the XML coding is likely to go unnoticed. Moreover, the rigid nature of XML structure is completely antagonistic to the freestyle editing, text formatting, and layout control, which are the touchstone of good word processor.

Recently, XML editors have become available for editing documents in XML. Because these conventional XML editors are specially designed for editing XML documents, they strictly adhere to the XML structure. These XML editors make XML markup easier to manage than a plain text editor, but they impose restrictions on its user that prevent him from freely editing and formatting a document, as allowed by traditional word processors. Rather, the user is trapped in an editing environment where the structure of XML controls how content is edited in the document. This makes for a poor user experience, especially if the user desires to tailor the visual aspects of the document.

SUMMARY OF THE INVENTION

Briefly stated, this invention is directed to a word-processor that provides a freestyle-editing environment for editing an XML document that monitors the XML document for well-formedness. In one aspect, the invention provides a wordprocessing system that includes a word processor and an XML structure monitor. The word processor is configured to provide a freestyle-editing environment to a user for editing and formatting an XML document. The freestyle-editing environment enables the user to freely edit the XML document while maintaining the XML integrity of the document. The XML well-formedness monitor is configured to determine if a change to the XML document causes it to not be well-formed, and, if so, to automatically correct the XML document to maintain well-formedness.

In another aspect, the XML well-formedness monitor may access predefined XML well-formedness rules for determining whether the XML document is well-formed. The XML well-formedness monitor may also access predefined correction rules for correcting the XML document to maintain well-formedness.

In yet another aspect, the invention is directed to a method for providing a freestyle-editing environment for editing an XML document and monitoring the XML document for well-formedness. In the freestyle-editing environment, a user is allowed to freely edit the XML document, while in the background, the XML integrity of the document is being maintained. The method determines whether the XML document contains at least one well-formedness violation. If so, the method automatically corrects the violation to restore well-formedness.

In still yet another aspect, the invention monitors the XML document in response to a triggering event. The triggering event is configured to reduce interruption while the XML document is being edited.

DETAILED DESCRIPTION OF THE PREFERRED EMBODIMENT

Briefly stated, this invention is directed to a word-processor that provides a freestyle-editing environment for editing an XML document while monitoring the XML document for well-formedness. The word processor monitors the XML document to determine if the XML document is well-formed and to automatically correct the XML document to maintain well-formedness.

Figure 1:
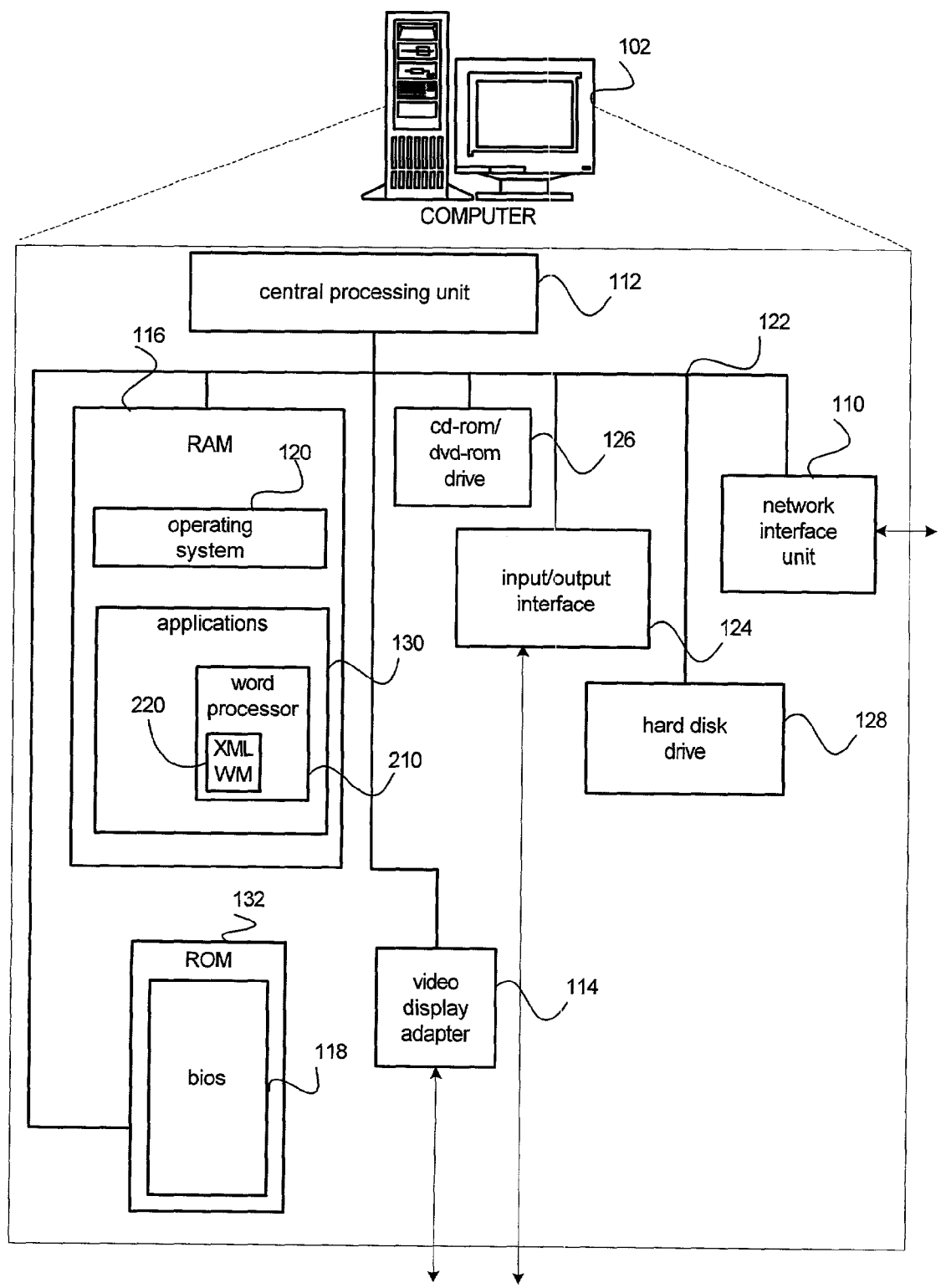
FIG. 1 is an exemplary computer that may be included in a system implementing this invention.

FIG. 1 and the following discussion are intended to provide a brief general description of a suitable computing environment in which the invention may be implemented. Although not required, this invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that this invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 is an exemplary computer 102 that may be included in a system implementing this invention, according to one embodiment of the invention. In other configurations, computer 102 may include many more components than those shown. Computer 102 includes processing unit 112, video display adapter 114, and a mass memory, all in communication with each other via bus 122. The mass memory generally includes RAM 116, ROM 132, and one or more permanent mass storage devices, such as hard disk drive 128, tape drive, optical drive, and/or floppy disk drive. The mass memory stores operating system 120 for controlling the operation of computer 102. A general-purpose operating system may be employed. Basic input/output system ("BIOS") 118 is also provided for controlling the low-level operation of computer 102.

As illustrated in FIG. 1, computer 102 may also include network interface 110 for connecting to a network such as a local area network (LAN), a wide area network (WAN), such as the Internet, or any other network. Network interface 110 is constructed for use with various communication protocols including the TCP/IP protocol. Communication media between computer 102 and a network typically embodies computer readable instructions, program modules or other data in a modulated data signal such as a carrier wave or other transport mechanism and includes any information delivery media. The term "modulated signal" means a signal that has one or more of its characteristics set or changed in such a manner as to encode information in the signal. By way of example, not limitation, communication media includes wired media such as a wired network or direct-wired connection, and wireless media such as acoustic, RF, infrared and other wireless media. Combinations of any of the above should also be included within the scope of computer readable media.

Computer 102 also includes input/output interface 124 for communicating with external devices, such as a mouse, keyboard, scanner, or other input devices not shown in FIG. 1. Likewise, computer 102 may further include additional mass storage facilities such as CD-ROM/DVD-ROM drive 126 and hard disk drive 128. Hard disk drive 128 is utilized by computer 102 to store, among other things, application programs, databases, server applications, and program data.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, Ad magnetic cassettes, magnetic tape, magnetic disk storage or other magnetic storage devices, or any other medium which can be used to store the desired information and which can be accessed by a computing device.

The mass memory may store program code and data for computer application programs 130, such as word processor 210. Word processor 210 may include an XML well-formedness monitor 220 that monitors XML documents created and edited by word processor 210 for well-formedness. Word processor 210, XML well-formedness monitor 220, and related components are described in detail in conjunction with FIG. 2.

Figure 2:
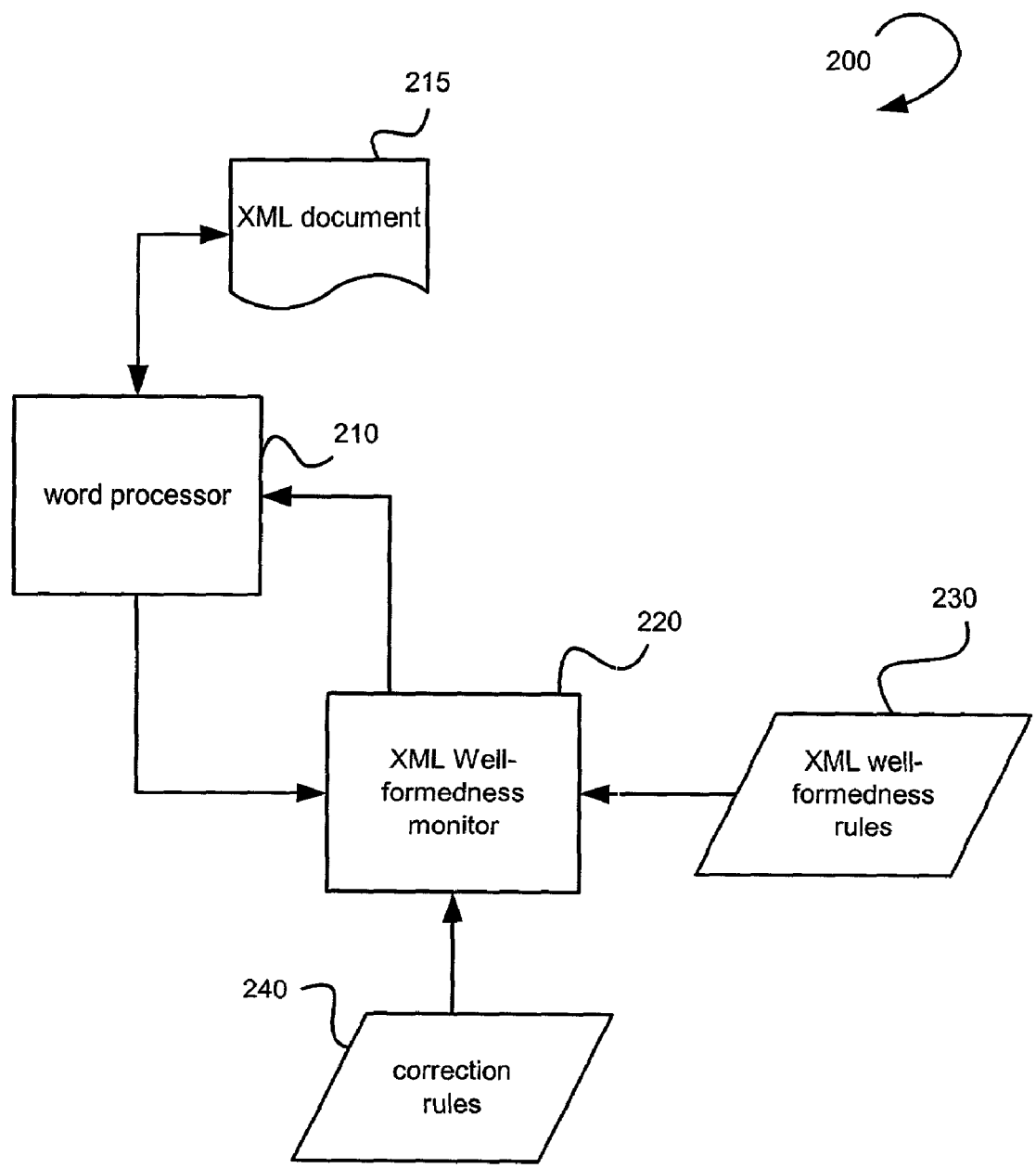
FIG. 2 is a schematic diagram of an exemplary XML document monitoring system.

FIG. 2 is a schematic diagram of an exemplary XML word processing system 200, according to one embodiment of the invention. The XML word processing system 200 controls the editing of electronic XML documents and monitors the documents for well-formedness.

Word processor 210 is a computer application program that is configured to provide a user with a freestyle-editing environment for editing and formatting electronic documents. In the freestyle-editing (environment, the user may freely edit an electronic document to shape its visual aspects to fit her needs. In particular, the user may freely create, modify, delete, and perform other editing actions to the content of the electronic document without being prevented from editing due to well-formedness requirements associated with the contents in the document. For example, if the contents in the electronic document include XML elements, the user is not prevented from editing the contents due to the structural requirements of XML, even if the user's edit could violate the XML integrity of the document.

XML document 215 is one type of document that word processor 210 may control. XML document 215 is an electronic document containing XML elements. As briefly mentioned above, an XML element -is defined by XML tags. An example of an XML element is <intro>A fox jumps over a lazy dog.</intro>

In this example, the XML element is "intro", which is defined by a start tag (<intro>) and an end tag (</intro>). Additionally, one XML element may contain another XML element. For example, in the XML code <intro><subject>A fox</subject>jumps over a lazy dog.</intro> the "intro" element contains the "subject" element. In XML terminology, the "subject" element is nested within the "intro" element.

An XML document created by word processor 210 may include both native XML tags and normal XML tags. Normal XML tags are XML tags entered in the document by the user. Native XML tags are automatically created by word processor 210 and may correspond to formatting related actions performed by word processor 210 in the XML document. For example, if a user enters the line A fox jumps over a lazy dog. The dog barks!

in a document and saves the document as an XML file, the word processor 210 may modify the line into <para>A fox jumps over a lazy dog. The dog barks!</para> where the "para" tags correspond to XML code entered by word processor 210 to create a paragraph element in a document. In another example, if a user starts a new line (e.g. by pressing the enter key) after the first sentence, word processor 210 may modify the document to include <para>A fox jumps over a lazy dog.</para>
<para>The dog barks.</para>

In this example, word processor 210 enters two additional "para" tags, which correspond to XML code for creating a new line. Native XML tags may include XML tags that correspond to other word processing actions, such as table cell manipulation, fonts definition, headers and foolers, and the like. It is to be appreciated that because word processor 210 enables the user to edit in a freestyle-editing environment, the user may edit the XML document in such a way that the resulting document is not well-formed. For example, the user may manually insert new normal XML tags that interfere with native XML tags.

Depending on the preference of a user, native XML tags and normal XML tags may or may not be visibly represented to the user. Word processor 210 allows the user to choose whether to display XML tags during the editing of an XML document. The user may not choose to view the XML tags because she may find that displaying the tags in conjunction with other content skews the visual aspects of the document and, thereby, distracts her editing of the document.

In another scenario, the user may not be expected to know that there are native XML tags in the document that she is editing, or to even understand XML. She may merely be the editor of the substantive content of the document. The XML developer may set up the document in such a way as to hide the XML tags from the user. For example, the XML developer could provide a document template for the user to create new documents. The template may contain the XML tags that are not viewable by the user. The XML tags will facilitate the process of data extraction and manipulation when the document is used in a later time.

XML well-formedness monitor 220 is a computer executable component that monitors XML documents. In particular, XML well-formedness monitor 220 determines and automatically corrects well-formedness violations in XML documents. XML well-formedness monitor 220 may be an independent component or a sub-component of a computer application program. In one embodiment, XML well-formedness monitor 220 is a sub-component of word processor 210. As shown in the figure, XML well-formedness monitor 220 has access to XML well-formedness rules 230 and correction rules 240. Briefly, XML well-formedness monitor 220 determines well-formedness violations using XML well-formedness rules 230 and corrects the determined violations using correction rules 240.

XML well-formedness rules 230 are rules that are used by XML well-formedness monitor 220 to determine well-formedness violations. XML well-formedness rules 230 may include some of the rules imposed by an XML standard. In one embodiment, XML well-formedness rules 230 include a tag-matching rule and a tag-nesting rule. The tag-matching rule requires that every start tag has a matching end tag and every end tag has a matching start tag. The tag-nesting rule requires that XML elements be properly nested. Regarding the tag-nesting rule, XML elements are not properly nested if a portion of a first element overlaps a second element but the first element is not entirely contained within the second element. For example, in the XML code

```
<sent1>A fox <action>jumps over a dog</sent1>and
  <sent2>steals his bone</action>without hesitation.</sent2>
``` the XML elements are not properly nested because the "action" element is opened before the "sent1" element is closed but the "action" element is closed after the "sent1" element is closed. Likewise, the "sent2" element is opened after the "action" element is open, but "action" element is closed before the "sent2" element is closed. This structure violates the nesting rule of the XML standard.

Corrections rules 240 are rules that the XML well-formedness monitor 220 may apply to correct the content of an XML document to maintain well-formedness. Each of corrections rules 240 may be applied, singularly or in conjunction with another rule, to correct one or more violations of XML well-formedness rules 230. In one embodiment, corrections rules 240 include correcting a tag-matching violation by automatically deleting the tag that caused the violation. For example, consider an XML document with the XML code

```
<intro>A fox</subject>jumps over a lazy dog.</intro>
```

This code violates the tag-matching rule because the start tag of the "subject" element is missing. Perhaps the user intended to delete the entire "subject" element but only deleted the start tag of the element. Applying the rule would result in the automatic deletion of the end tag of the "subject" element.

In another embodiment, corrections rules 240 include correcting a tag nesting violation caused by a first XML element improperly overlapping a second element. The correction may be made by automatically modifying a tag of one element so that the first element is contained within the second element. For example, consider the example above, which includes the XML code

```
<sent1>A fox<action>jumps over a dog</sent1>and<sent2>steals his bone</action>without hesitation.</sent2>
```

The tag-nesting violation is caused by the "action" element improperly overlapping the "sent1" element as well as the "sent2" element. Applying the rule could result in the end tag of the "action" element being automatically moved to just before the end tag of the "sent1" element. Accordingly, the violation is corrected because the "action" element is completely nested within the "sent1" element. In practice, either tag of the "action" element may be modified.

In yet another embodiment, corrections rules 240 require XML well-formedness monitor 220 to determine which XML tags to modify (move, add, or delete) based on the tags' priorities. For example, corrections rules 240 may require normal XML tags to be modified before modifying native XML tags. Consider the XML code

```
<nat>Some Text<nor>Inner Text</nor>More Text</nat>
```

The "nat" tags are native tags and the "nor" tags are normal tags entered by a user. In this example, the "nat" tags are used to define a paragraph. If the user creates a new line (e.g. by pressing the enter key) when the cursor is in between "Inner" and "Text", the resulted XML code will contain a well-formedness violation if it is not corrected. The violated code would look like

```
<nat>Some Text<nor>Inner</nat>
<nat>Text</nor>More Text</nat>
``` which contains a tag-nesting violation. Since this example requires normal tags to be modified before modifying native tags, the "nor" tag will be moved. The corrected XML code will become

```
<nat>Some Text<nor>Inner</nor></nat>
<nat>Text More Text</nat>
``` which no longer contains a well-formedness violation.

In another example, corrections rules 240 may require native XML tags to be modified before moving normal XML tags. Here, consider the XML code

```
<nat1>Here is some bold text</nat1><nat2>Here is some italic text</nat2>
```

In this example, the "nat1" tags are native tags for bolding text and the "nat2" tags are native tags for italicizing text. If a user creates a pair of tags, one in front of the word "text" and another after the word "Here", the resulting XML code will contain a well-formedness violation if it is not corrected. The XML code with the violation would look like

```
<nat1>Here is some bold<nor>text</nat1><nat2>Here</nor>is some italic text</nat2>
``` where the placement of the "nor" tags results in a tag-nesting violation. This example requires normal tags to be modified before moving the native tags. After the appropriate correction, the XML code will become \<nat1\>Here is some bold\</nat1\>
\<nor\>\<nat1\>text\</nat1\>\<nat2\>Here\</nat2\>\</nor\>
\<nat2\>is some italic text\</nat2\> which contains four additional native tags that cure the well-formedness violation.

It is to be appreciated that many other XML well-formedness rules and correction rules will become apparent to those :killed in the art from this disclosure in conjunction with the XML standard. The rules and corrections described here are for illustrative purposes only. The choice of rules is merely an implementation preference and does not affect the overall scope of the invention.

Figure 3:
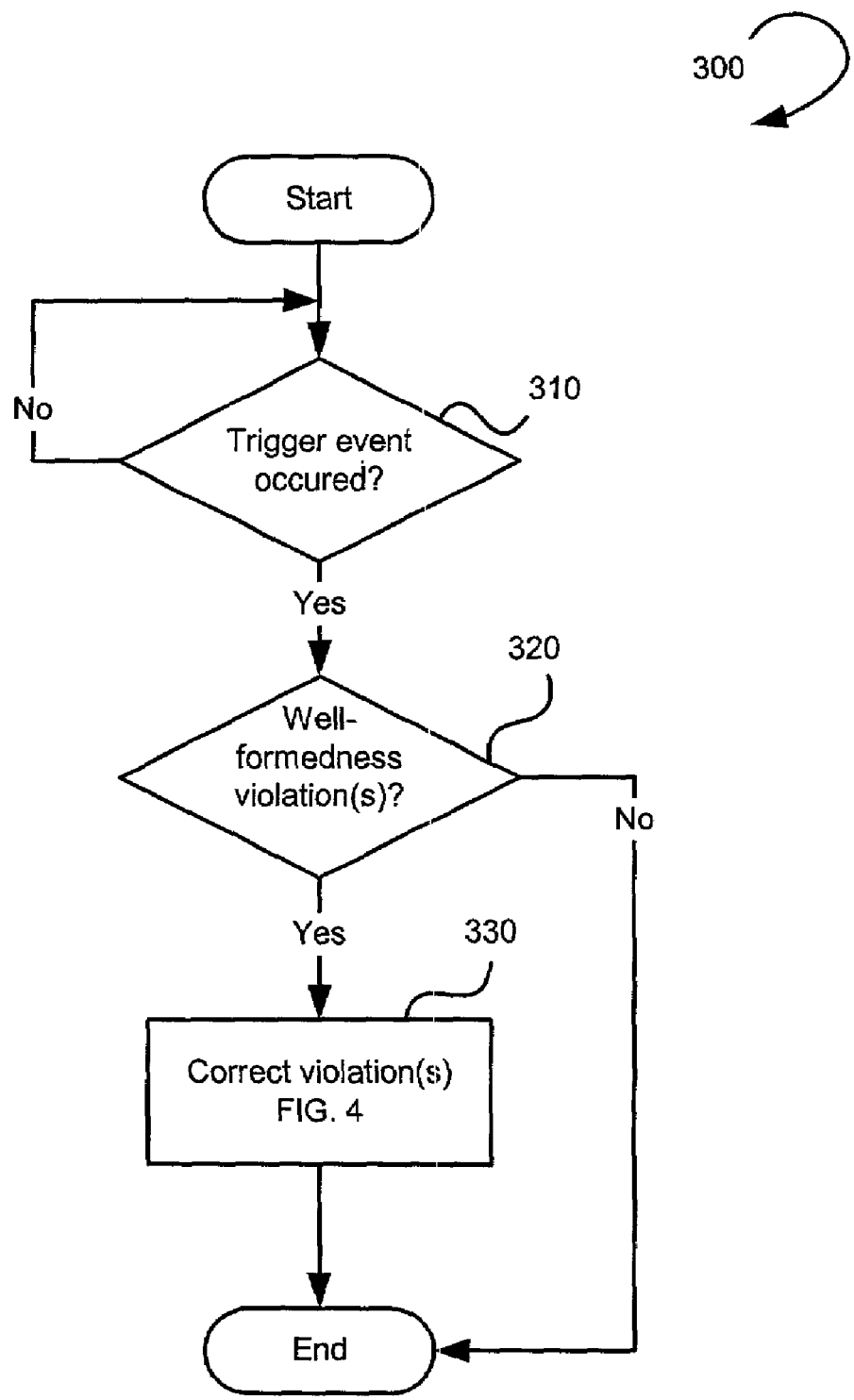
FIG. 3 is an operational flow diagram generally illustrating an exemplary process for monitoring an XML document for well-formedness.

FIG. 3 is an operational flow, diagram generally illustrating an exemplary process 300 for monitoring an XML, document for well-formedness. Process 300 may be employed by an XML structure monitor.

Process 300 enters from a start block when an XML document is created or edited by a word processor. At block 310, a determination is made whether a triggering event has occurred. A triggering event is an event that causes the XML well-formedness monitor to monitor the XML document. Triggering events may include a variety of events associated with actions or inaction of the word processor. For example, an editing action, such as the insertion or deletion of characters, may be a triggering event. A triggering event may also be timing related event, such as when no editing action has occurred for a predetermined period of time. It is to be appreciated that since well-formedness monitoring may affect the performance of the word processor and the XML document, the triggering events may be configured to reduce interruption while the XML document is being edited.

Process 300 idles at block 310 until a triggering event occurs. When it does, process 300 moves to decision block 320 where a determination is made whether the XML document contains at least one well-formedness violation. The XML document contains a well-formedness violation if the document violates at least one XML structure rule. For instance, referring to FIG. 2, word processor 210 may hand off a portion of XML document 215 to the XML well-formedness monitor 220, such as in response to an edit. Word processor 210 may pass less than the entire XML document 215, such as a portion surrounding the edit. The XML well-formedness monitor 220 then refers to the XML well-formedness rules 230 to analyze the portion of the XML document 215 for well-formedness. The XML well-formedness monitor 220 then returns a notice to word processor 210 whether a violation has occurred. If there is no well-formedness violation, process 300 returns.

If the XML document contains at least one well-formedness violation, process 300 continues at block 330 where the determined well-formedness violations are automatically corrected. An exemplary process for correcting well-formedness violations will be discussed in detail in conjunction with FIG. 4. Briefly stated, each determined well-formedness violation may be corrected by applying one or more correction rules. When the determined well-formedness violations in the XML document have been corrected, process 300 returns.

The step represented by block 320 and the step represented by block 330 are presented as separate steps for illustrative purposes. It is to be appreciated that both steps may be combined into a single step.

Figure 4:
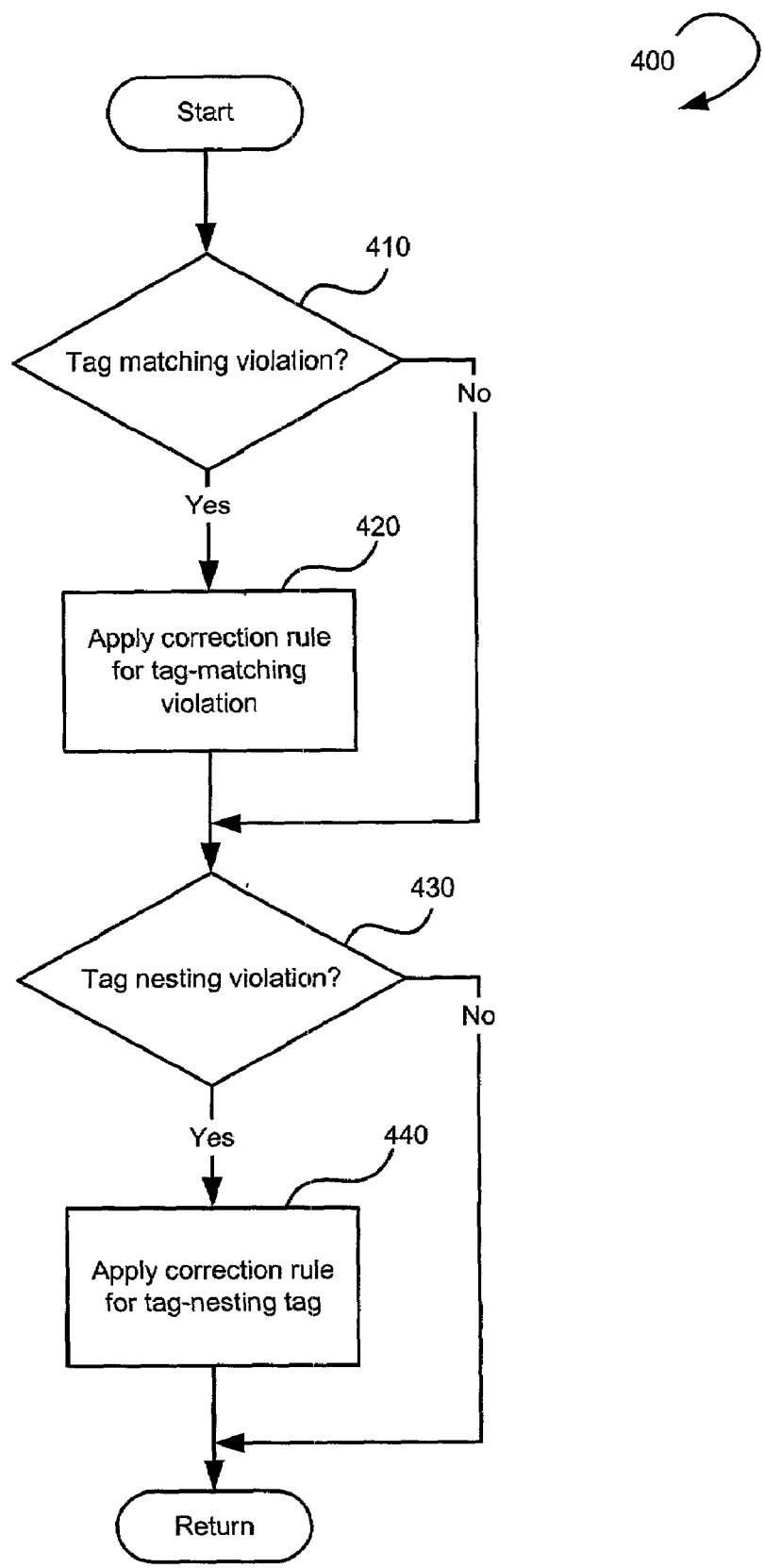
FIG. 4 is an operational flow diagram generally illustrating an exemplary process for determining and correcting well-formedness violations.

FIG. 4 is an operational flow diagram generally illustrating an exemplary process 400 for determining and correcting well-formedness violations. Process 400 may be used by an XML structure monitor. For ease of illustration, this exemplary process only determines and corrects tag-matching violations and tag-nesting violations. Other violations may be corrected using similar processes.

Process 400 enters from a start block. At block 410, a determination is made whether there is a tag-matching violation. If no tag-matching violation is found, process 400 continues at decision block 430. Otherwise, process 400 moves to block 420 where the tag-matching violation is corrected by applying a correction rule. In one embodiment, the tag-matching violation is corrected by deleting the tag that caused the violation. In another embodiment, the missing tag may be automatically inserted. After the correction is made, the process also continues at decision block 430.

At decision block 430, a determination is made whether there is a tag-nesting violation. If no tag-matching violation is found, process 400 returns. Otherwise, process 400 continues at block 440 where the tag-nesting violation is corrected by applying a correction rule. In one embodiment, the tag-nesting violation is corrected by moving one of the tags of the element that caused the violation such that the element is contained within another element.

In summary, the invention enables a word processing system that provides a user with a rich freestyle editing experience, while simultaneously maintaining the integrity of an XML document. Edits by the user are evaluated for well-formedness in the background. If an XML violation occurs, rather than preventing the user from making the edit, a correction rule is applied to bring the document back into conformity with the XML structure rules.

The above specification, examples and data provide a complete description of the invention. Since many embodiments of the invention can be made without departing from the spirit and scope of the invention, the invention resides in the claims hereinafter appended.

What is claimed is:

1. A computer-readable medium encoded with computer-executable components, comprising:
   a word processor configured to provide a freestyle-editing environment for editing an XML document comprising a first tag pair and a second tag pair, the freestyle-editing enviromnent enabling free editing of the XML document; and
   an XML well-formedness monitor associated with the word processor, the XML well-formedness monitor being configured to:
   determine if the XML document violates a tag-nesting rule, wherein the tag-nesting rule requires that the first tag pair is entirely contained within the second tag pair,
   determine a priority established between the first tag pair and the second tag pair based on whether the tag pair is a normal XML tag pair or a native XML tag pair, and
   automatically execute a correction rule to restore the well-formedness of the XML document when the XML document contains a tag-nesting rule violation, wherein the correction rule is executed by moving one tag in the tag pair that is associated with a higher priority such that the first tag pair is entirely contained within the second tag pair.

2. The computer-readable medium of claim 1, wherein the XML well-formedness monitor is a component of the word processor.

3. The computer-readable medium of claim 1, wherein the priority associated with normal XML tags is higher than the priority associated with native XML tags.

4. The computer-readable medium of claim 1, wherein the priority associated with native XML tags is higher than the priority associated with normal XML tags.

5. A computer-implemented method for controlling the editing of an XML document comprising a first tag pair and a second tag pair, the method comprising:
- determining whether the XML document contains tag-nesting rule violation, wherein the tag-nesting rule requires that the first tag pair is entirely contained within the second tag pair;
- determining a priority established between the first tag pair and the second tag pair based on whether the tag pair is a normal XML tag pair or a native XML tag pair; and
- automatically executing a correction rule when the XML document contains a tag-nesting rule violation, wherein the correction rule is executed by moving one tag in the tag pair that is associated with a higher priority such that the first tag pair is entirely contained within the second tag pair.

6. The computer-implemented method of claim 5, wherein determining whether the XML document contains tag-nesting rule violation is performed in response to a triggering event.

7. The computer-implemented method of claim 6, wherein the triggering event occurs in response to an edit of the XML document.

8. The computer-implemented method of claim 6, wherein the triggering event is a timing related event.

9. The computer-implemented method of claim 6, wherein the triggering event is configured to reduce interruption while the XML document is being edited.

10. The computer-readable medium of claim 5, wherein the priority associated with normal XML tags is higher than the priority associated with native XML tags.

11. The computer-readable medium of claim 5, wherein the priority associated with native XML tags is higher than the priority associated with normal XML tags.

* * * * *